United States Patent [19]

Bovo et al.

[11] 4,076,966
[45] Feb. 28, 1978

[54] METHOD OF AND SYSTEM FOR HANDLING CONFERENCE CALLS IN DIGITAL TELEPHONE EXCHANGE

[75] Inventors: Amilcare Bovo, Milan; Giuseppe Valsecchi, Lecco (CO), all of Italy

[73] Assignee: Societa Italiana Telecomunicazioni Siemens S.p.A., Milan, Italy

[21] Appl. No.: 710,636

[22] Filed: Aug. 2, 1976

[51] Int. Cl.² .............................................. H04M 3/56
[52] U.S. Cl. ........................... 179/18 BC; 179/15 AT; 179/15 BW
[58] Field of Search .......... 179/1 CN, 18 BC, 15 AP, 179/15 BW, 15.55 T, 15.55 R, 15 AT; 340/347 DD

[56] References Cited

U.S. PATENT DOCUMENTS

| 3,755,808 | 8/1973 | Candiani | 340/347 DD |
| 3,789,392 | 1/1974 | Candiani | 179/15 BW |
| 3,984,643 | 10/1976 | Inrig | 179/18 BC |

Primary Examiner—Kathleen H. Claffy
Assistant Examiner—Joseph A. Popek
Attorney, Agent, or Firm—Karl F. Ross

[57] ABSTRACT

A telephone exchange linked via PCM channels with subscribers engaged in a conference call includes switching circuits for transmitting to each participating subscriber, during an assigned time slot, the albegraic sum of the digitized voice-current samples from all the other participants. The digitized samples are logarithmically coded, each code consisting of a polarity bit, three range bits and four quantum bits; in order to facilitate correct addition or subtraction of the quantum bits of two codes to be summed (unless these codes signify the two lowest-ranking ranges), according to whether their sign bits are identical or different, the quantum bits of a lower-ranking code are shifted in a register toward less significant bit positions in which they would have their original numerical weight when prefaced by the range bits of the higher-ranking code. The range bits are not summed but only those of the higher-ranking code are preserved, their numerical value being incremented by one in the case of addition but left unchanged or decremented by one (if a negative carry is present) in the case of subtraction. If the difference in rank exceeds the number of quantum bits, i.e. four, the lower-ranking code is ignored.

12 Claims, 10 Drawing Figures

METHOD OF AND SYSTEM FOR HANDLING CONFERENCE CALLS IN DIGITAL TELEPHONE EXCHANGE

FIELD OF THE INVENTION

Our present invention relates to a method of and a system for handling conference calls among three or more telephone subscribers in a central office or exchange of digital type linked with these subscribers by pulse-code-modulation (PCM) channels.

BACKGROUND OF THE INVENTION

The digitization of voice samples in time-division-multiplex (TDM) telecommunication systems is well known. Thus, a code word of 12 bits — including a polarity-indicating sign bit — can be used to express $2^{11}$ = 2048 distinct amplitude levels of a bipolar signal divided into eight ranges which are of identical widths on a logarithmic scale, i.e. a lowest range of 0–15 units (e.g. millivolts), a second range of 16–31 units, a third range of 32–63 units etc., up to a highest range of 1024–2047 units. As taught in commonly owned U.S. Pat. Nos. 3,755,808 and 3,789,392 issued in the name of Giampiero Candiani, such ordinary digital code words can be compressed into eight-bit codes and then re-expanded into their original 12 bits, with only minor loss of information, by expressing the rank of each code — i.e. the order number of its amplitude range — in binary form by means of three range bits which immediately follow the sign bit and are in turn succeeded by four quantum bits X, Y, Z, W representing the most significant bits following directly after the first "one" (or after the eighth "zero" in the case of the lowermost range) in the original code word. In more general terms, such a compressed code word consists in descending order of a sign or polarity bit, $m$ range bits and $n$ quantum bits.

A peculiarity of this type of compressed code word is the fact that the numerical weight of its quantum bits doubles from the second-lowest to the highest range while being the same in the two lowermost ranges. This prevents the direct positive or negative algebraic summing (i.e. adding or subtracting) of the range bits of two such codes, derived from a pair of coincident voice samples, unless they happen to be either of the same rank or of the two lowest ranks, referred to hereinafter as rank 0 and rank 1. Such algebraic summation is necessary in a conference call in which each participating subscriber is to receive superposed voice samples from all the other participants. It has therefore been the practice, in an exchange serving PCM channels of this type engaged in a conference call, to expand the incoming compressed codes for linear superposition and to re-compress the resulting codes for transmission to PCM terminals serving the receiving subscribers. Such double conversion requires complex and correspondingly expensive central-office equipment.

OBJECT OF THE INVENTION

The object of our present invention, therefore, is to provide a simplified method of and system for linearly superposing significant portions of such logarithmically coded voice samples without expansion and recompression.

SUMMARY OF THE INVENTION

This object is realized, in accordance with our present invention, by separately storing a higher-ranking code and a lower-ranking code which are to be arithmetically combined, downshifting the quantum bits of the lower-ranking code to less significant bit positions in which they would have their original numerical weights if prefaced by the range bits of the higher-ranking code, comparing the polarity bits of the two codes, and subjecting the quantum bits of the higher-ranking code and the downshifted bits of the lower-ranking code to an algebraic summing operation of positive or negative sign, i.e. addition or subtraction, depending on the relative values of the corresponding polarity bits.

Since homologous quantum bits of codes of rank 0 and rank 1 have the same numerical weight, such a downshift will not occur if neither code has a rank higher than 1. Therefore, if the numerical difference of their ranks — as expressed by their respective combinations of range bits — has a value $\Delta t$, the downshifting will be by a number of bit positions equal to $\Delta t$ except where the lower-ranking code is of rank 0; in the latter case, the number of bit positions involved in the shift will be $\Delta t - 1$.

By this downshifting operation we achieve a linearization of the quantum bits, i.e. of the significant bits X, Y, Z, W according to the above-identified Candiani patents, which are predominantly responsible for the transmission of voice frequencies and whose linear superposition is therefore essential for conference-type telephone communication. No such high fidelity is needed for the range bits, especially if one of two simultaneously speaking subscribers has a substantially louder voice than the other. It will generally be sufficient, as we shall demonstrate hereinafter, to disregard the range bits of the lower-ranking code in forming the algebraic sum and to preserve only those of the higher-ranking code in a composite code resulting from the summing operation, with possible incrementation or decrementation of their numerical value by one. With additive summing, we prefer increasing the range number by +1 in all instances except where both codes are of rank 0, along with a compensatory downshifting of the resultant quantum bits by one bit position. If the lower-ranking code has the rank 0, or if the ranks of the two codes are identical, this procedure is equivalent to linear addition of the entire codes. A positive carry produced by the adding of the quantum bits is accommodated in a bit position vacated by the last-mentioned downshift. With subtractive summing, conversely, a change in the range number of the higher-ranking code by −1 is necessary only when the calculation of the numerical difference of the two sets of quantum bits yields a negative carry; this decrease in the numerical value of the preserved range bits is to be compensated by a corresponding upshifting of the resultant quantum bits by one bit position, except in the case where the higher-ranking code is of rank 1 so that the downshift does not change the numerical weight of the quantum bits.

A system for carrying out this method comprises code-receiving means with two storage circuits, each including a first register for storing polarity and range bits and a second register for storing quantum bits of respective codes to be arithmetically combined, a first arithmetic unit connected to the first register for determining the difference in ranks between the two codes, linearization means connected to the second register and controlled by this arithmetic unit for carrying out the aforedescribed downshift of the quantum bits of the lower-ranking code, a second arithmetic unit connected to the second register and controlled by the contents of the first register for additive or subtractive summing of the two sets of quantum bits respectively held in the second registers of the two storage circuits, and evaluation means connected to the two arithmetic units for deriving a composite code from the range bits of the higher-ranking code and the quantum bits resulting from the algebraic summing operation. In the preferred embodiment or our invention more particularly described hereinafter, the evaluator includes a memory controlled by a program counter whose operation may be modified by associated logical circuitry under certain conditions such as, for example, the presence of two codes of rank 0 or the absence of a carry.

BRIEF DESCRIPTION OF THE DRAWING

The above and other features of our invention will now be described in detail with reference to the accompanying drawing in which.

SPECIFIC DESCRIPTION

Figure 1:
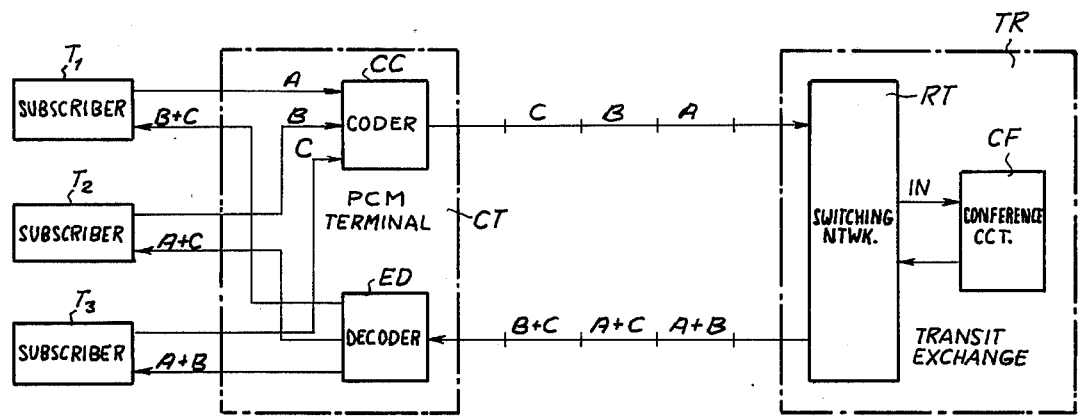
FIG. 1 diagrammatically shows the general layout of a telephone network including a transit exchange designed to handle conference calls among three subscribers in accordance with our invention.

FIG. 1 illustrates three telephone subscribers $T_1$, $T_2$ and $T_3$ assumed to be engaged in a conference call. For the sake of simplicity these subscribers have been shown as connected to a common terminal CT linked by outgoing and incoming PCM/TDM channels with a remote transit exchange TR, even though in practice such an exchange generally will not intervene in calls among subscribers served by the same terminal. Voice signals A, B and C respectively sent out by the three intercommunicating subscribers are converted in terminal CT, with the aid of a coder CC, into compressed eight-bit codes of the type discussed above and described in the two Candiani patents referred to. The coded signals are transmitted in respective channels (not necessarily consecutive, as indicated) of a PCM frame to a switching network RT of transit exchange TR which forwards them, in adjoining time slots, to a conference circuit CF where the codes are algebraically combined in conformity with our invention for retransmission, again via network RT, to terminal CT in combinations B+C, A+C and A+B in channels assigned to them by the network. A decoder ED reconverts these composite eight-bit compressed codes into analog signals and sends them on to their respective destinations, i.e. signals B+C to subscriber $T_1$, signals A+C to subscriber $T_2$ and signals A+B to subscriber $T_3$. The compounding of each pair of codes in circuit CF takes place in the course of an eight-bit time slot so that, in principle, all the subscribers using the available PCM channels could participate simultaneously in three-way or possibly four-way conference calls.

Figure 2:
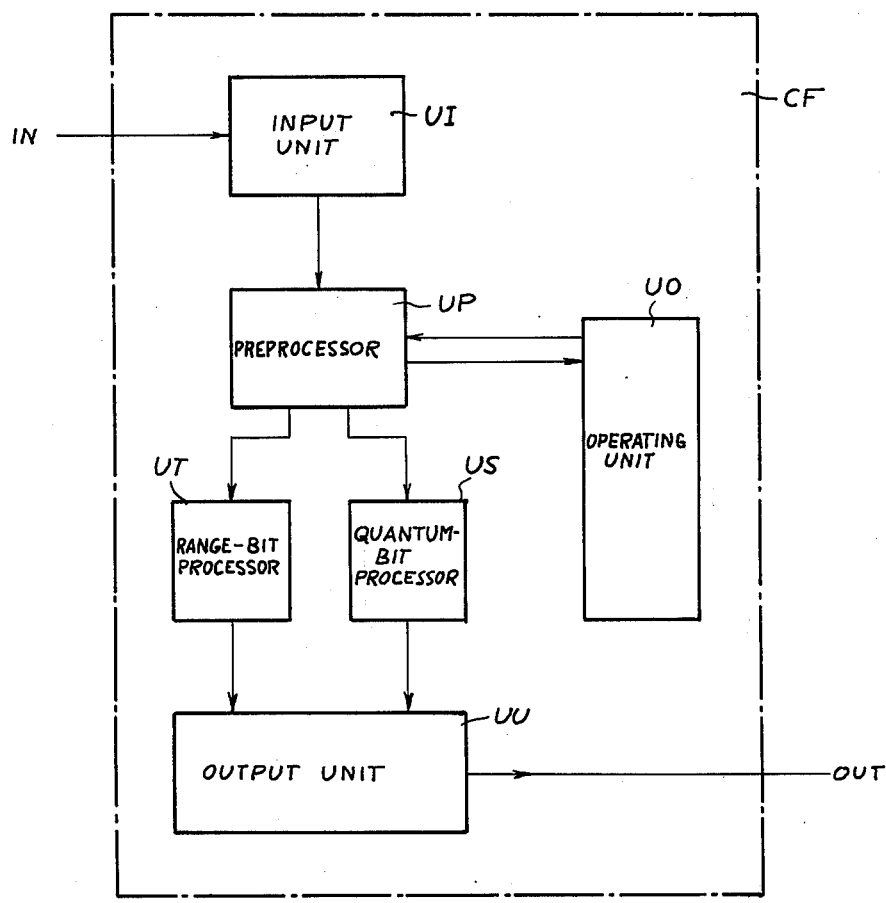
FIG. 2 is a block diagram of a conference circuit forming part of the transit exchange of FIG. 1.

In FIG. 2 we have shown the conference circuit CF of FIG. 1 as comprising an input unit UI receiving incoming codes on a lead label "in", and working into a preprocessor UP feeding range bits to a first processor UT and quantum bits to a second processor US. The two processors deliver the results of their operations to an output unit UU which periodically discharges the composite codes via a lead labeled "out". The three processing units UP, UT and US form part of an evaluation section which also includes an operating unit UO coacting therewith.

Figure 3:
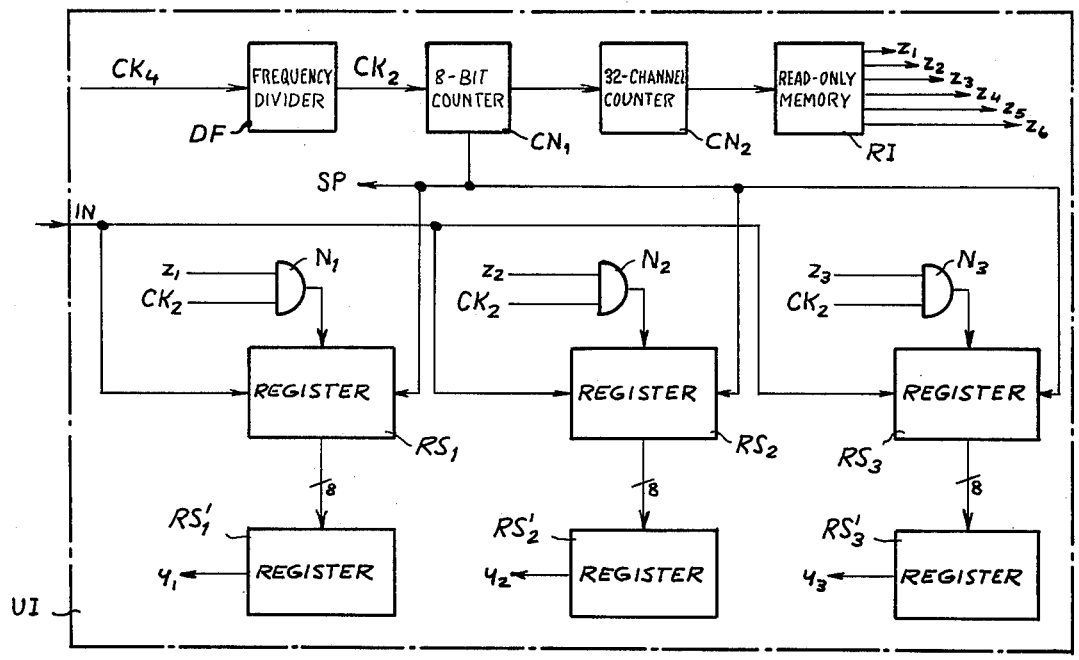
FIGS. 3–8 are more detailed diagrams of an input unit, a preprocessor, a first processor, a second processor, an output unit and an operating unit forming part of the conference circuit of FIG. 2.

Input unit UI, illustrated more fully in FIG. 3, is under the control of a timer including a frequency divider DF to which clock pulses $CK_4$ are fed from a nonillustrated generator with a cadence equaling twice the bit rate. Divider DF halves this cadence so as to produce a train of pulses $CK_2$ which step an 8-bit pulse counter $CN_1$ reaching its full count with the arrival of the last bit of the code word in a time slot of a periodically recurring PCM frame assumed to contain 32 such time slots, each recurrent time slot constituting a TDM transmission channel as is well known per se. Another pulse counter $CN_2$ of 32-pulse capacity is stepped by the counter $CN_1$ at the beginning of each new time slot to count the 32 channels. The several stage outputs of counter $CN_2$ are connected to a read-only memory RI which energizes a different output lead during each time slot of a frame, only six output leads $z_1 - z_6$ having been illustrated.

Figure 4:
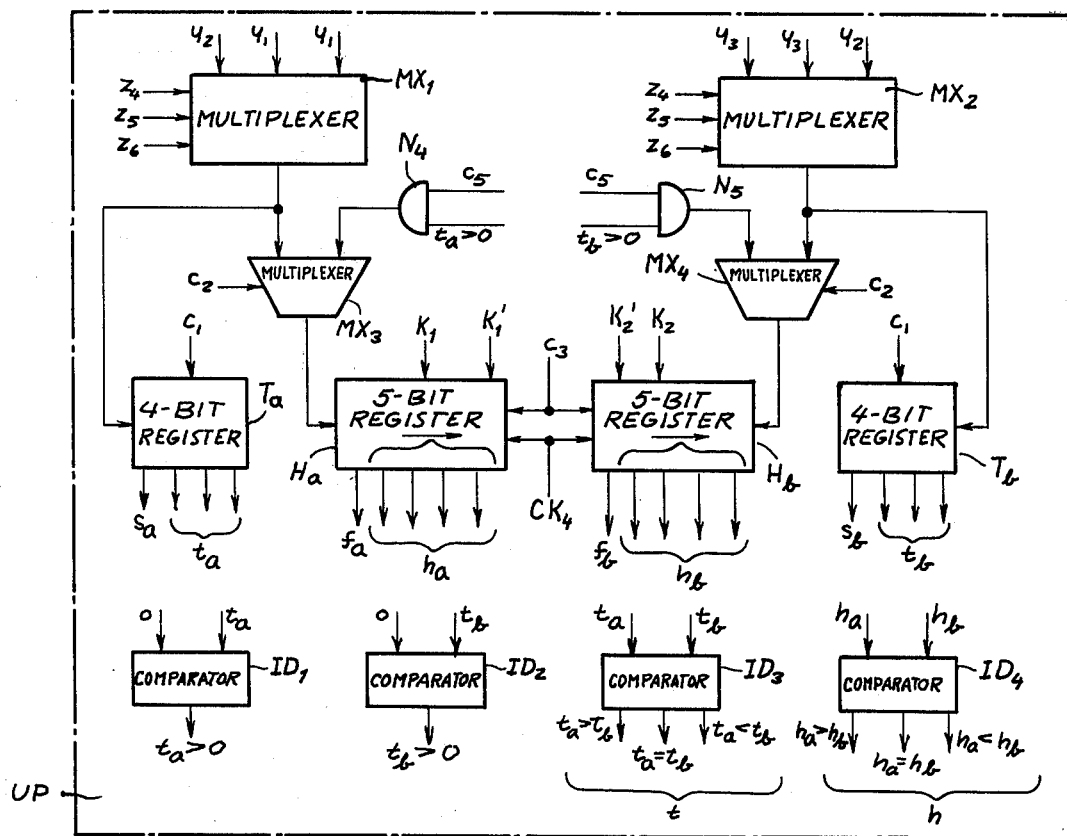

The bits of a code successively arriving over input lead "in" are fed in parallel to a number of registers of which only three, labeled $RS_1$, $RS_2$ and $RS_3$, have been illustrated. These registers are provided with enabling inputs including respective AND gates $N_1$, $N_2$, $N_3$ each receiving the clock pulses $CK_2$. The other inputs of these AND gates are respectively connected to output leads $z_1$, $z_2$ and $z_3$ of memory RI whereby only one register receives the clock pulses $CK_2$ in the course of a given time slot. In the case here assumed, register $RS_1$ is serially loaded in the first time slot of a frame with the coded voice sample A (see FIG. 1), registers $RS_2$ and $RS_3$ respectively receiving the codes B and C during the next-following two time slots. In response to a start pulse SP emitted by counter $CN_1$ upon the completion of its count, registers $RS_1$, $RS_2$ and $RS_3$ are discharged in parallel over respective 8-lead multiples into associated registers $RS'_1$, $RS'_2$ and $RS'_3$, respectively, so as to become available for the storage of new codes in the following cycle. The bits stored in ancillary registers $RS'_1$, $RS'_2$ and $RS'_3$ are serially read out, under the control of memory outputs $z_4-z_6$ as described below, via leads $y_1$, $y_2$ and $y_3$ extending to a pair of multiplexers $MX_1$ and $MX_2$ forming part of preprocessor UP as shown in FIG. 4.

Multiplexer $MX_1$ has two inputs connected to output lead $y_1$ of register $RS'_1$ and a third input connected to output lead $y_2$ of register $RS'_2$. Multiplexer $MX_2$ has two inputs connected to output lead $y_3$ of register $RS'_3$ and a third input connected to output lead $y_2$ of register $RS'_2$. Both multiplexers are simultaneously switchable by signals on leads $z_4$, $z_5$ and $z_6$ to direct the bits of a selected pair of stored codes to their respective outputs, i.e. codes B and C upon the energization of lead $z_4$, codes A and C upon the energization of lead $z_2$ and codes A and B upon the energization of lead $z_6$. The following discussion will be limited to the period of energization of lead $z_6$, this being the time slot during which the composite code A + B is to be produced for transmission via PCM terminal CT to subscriber $T_3$ as described above with reference to FIG. 1.

The bits of codes A and B are thus concurrently read out, in sequence, from multiplexers $MX_1$ and $MX_2$ into respective branches of preprocessor UP, i.e. a first branch including two registers $T_a$, $H_a$ and a second branch including two registers $T_b$, $H_b$. Registers $T_a$ and $T_b$ are of 4-bit capacity designed to accommodate the polarity bit $S_a$ or $S_b$ and the three range bits of their respective codes, collectively designated $t_a$, $t_b$. Registers $H_a$ and $H_b$ also have four stages each, designed to receive the quantum bits of their respective codes, collectively designated $h_a$, $h_b$, as well as a fifth stage for the storage of a supplemental bit $f_a$, $f_b$ indicating by its presence that the corresponding code is of a rank higher than zero. This fifth stage is shown only for convenience as part of register $H_a$ or $H_b$ but may in fact be considered a separate 1-bit store. The contents of the other four stages, containing the quantum bits, are shiftable to the right under the control of respective signals $K_1$ or $K_2$ for the purpose and under the conditions described hereinafter, such a shift occurring upon the occurrence of basic clock pulses $CK_4$. These four stages can also be immediately emptied by means of clearing pulses $K_1'$ and $K_2'$, respectively.

Figure 8:
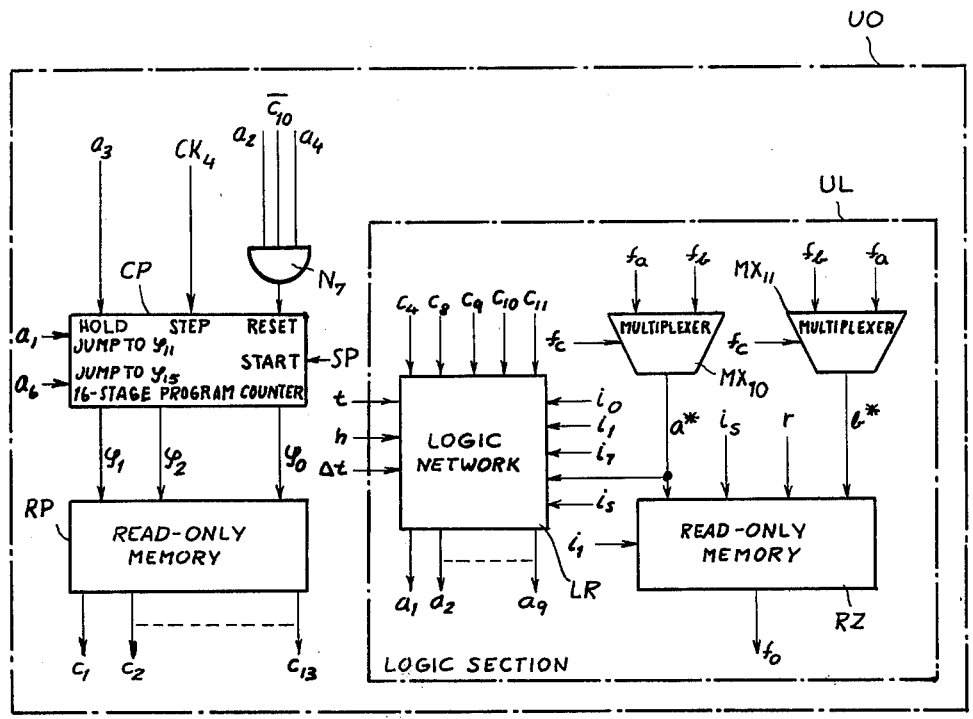

The writing inputs of registers $T_a$ and $T_b$ are connected directly to the outputs of the associated multiplexers $MX_1$ and $MX_2$ whereas the writing inputs of registers $H_a$ and $H_b$ are connected to the same outputs by way of further multiplexers $MX_3$ and $MX_4$. The loading of these registers is controlled by timing signals issuing from a read-only memory RP in unit UO controlled by a program counter CP as shown in FIG. 8. More specifically, registers $T_a$ and $T_b$ are loaded under the control of a signal $c_1$ whereas registers $H_a$ and $H_b$ are loaded under the control of a subsequent signal $c_3$ in the presence of a switching signal $c_2$ controlling the multiplexers $MX_3$ and $MX_4$. The range bits $t_a$ and $t_b$ appearing in three of the four stage outputs of registers $t_a$ and $t_b$ are fed to three comparators $ID_1$, $ID_2$ and $ID_3$ serving to identify the respective codes A and B in terms of relative rank. Comparators $ID_1$ and $ID_2$ have a threshold level 0 so as to emit respective signals $t_a > 0$ and $t_b > 0$ if these codes are of other than rank −0. These two signals are applied to respective inputs of a pair of AND gates $N_4$ and $N_5$ also receiving a control signal $c_5$ from memory RP of FIG. 8; AND gates $N_4$ and $N_5$ are connectable via multiplexers $MX_3$ and $MX_4$ upon the disappearance of signal $c_2$, to the writing inputs of registers $H_a$ and $H_b$ to store therein the bits $f_a$ and $f_b$ if the respective comparators $ID_1$ and $ID_2$ have an output. The third comparator $ID_3$ receives both sets of range bits $t_a$ and $t_b$ to energize one of three output leads with a respective signal $t_a > t_b$, $t_a = t_b$ or $t_a < t_b$, collectively designated $t$. A fourth comparator $ID_4$ receives the two sets of quantum bits $h_a$ and $h_b$ from registers $H_a$ and $H_b$, energizing one of three output leads with a respective signal $h_a > h_b$, $h_a = h_b$ or $h_a < h_b$, collectively designated $h$.

Figure 5:
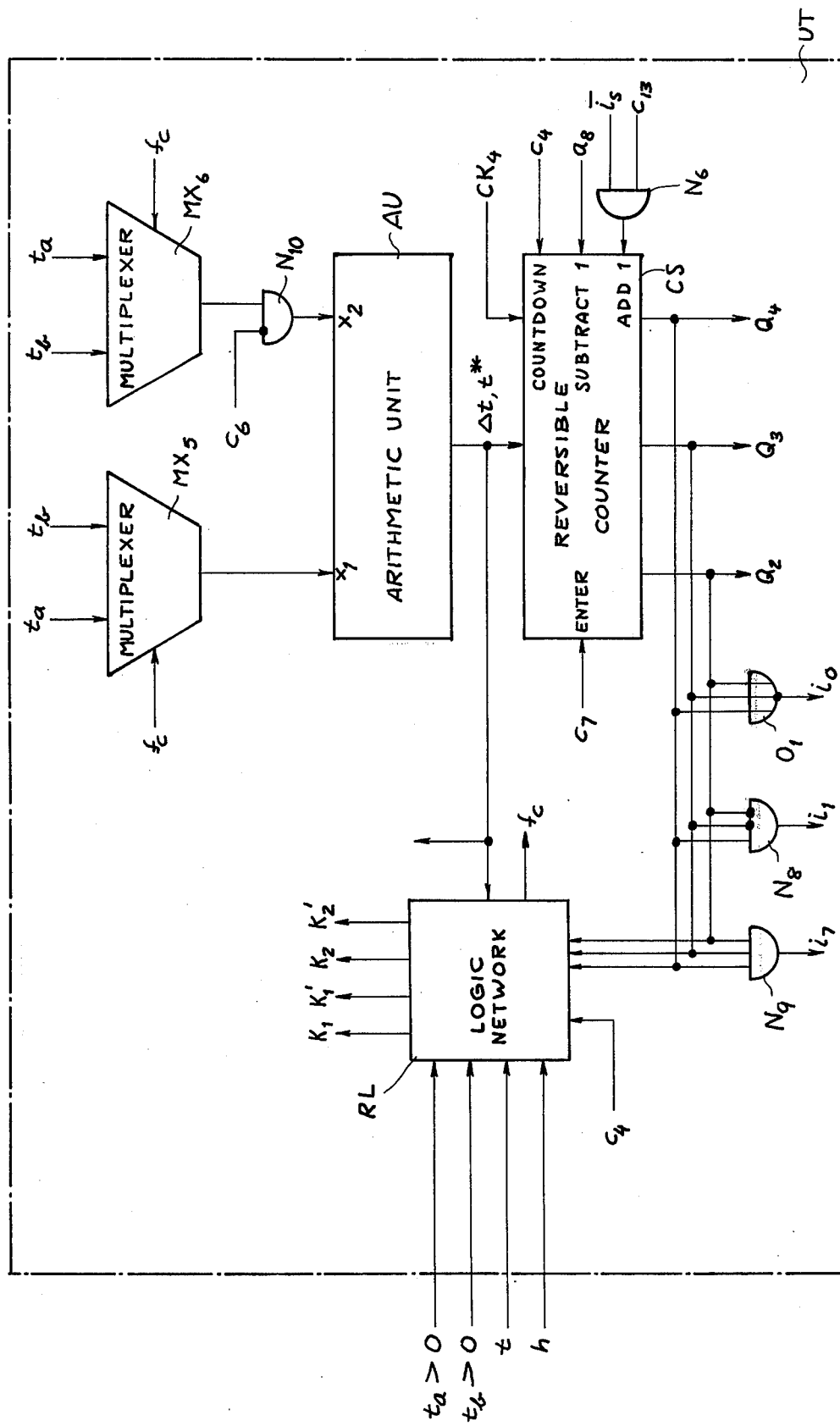

Processor UT, shown in FIG. 5, comprises two multiplexers $MX_5$ and $MX_6$ receiving the range bits $t_a$ and $t_b$ in parallel from registers $T_a$ and $T_b$. These multiplexers, whose inputs are simultaneously switchable by a signal $f_c$ generated by a logic network RL, work into respective inputs $x_1$ and $x_2$ of an arithmetic unit AU. Logic network RL receives the output signals $t_a > 0$, $t_b > 0$. $t$ and $h$ from comparators $ID_1$ and $ID_4$ as well as a control signal $c_4$ from memory RP (FIG. 8) and the output of arithmetic unit AU which is either the numerical difference $\Delta t$ of the bit combinations fed to its inputs $x_1$ and $x_2$ or only the numerical value $t^*$ of the combination of range bits at input $x_1$, depending on the absence or presence of a timing signal $c_6$ delivered to an inverting input of an AND gate $N_{10}$ which is interposed between multiplexers $MX_6$ and input $x_2$. Switching signal $f_c$ comes into existence whenever the combination of bits $t_a$ and $h_a$ has a numerical value larger than that of the combination of bits $t_b$ and $h_b$, i.e. when the absolute magnitude of the coded signal A exceeds that of the coded signal B. Thus, $$f_c = (t_a > t_b) + (t_a = t_b) \cdot (h_a > h_b) \tag{1}$$

with $f_c = 1$, bit groups $t_a$ and $t_b$ are respectively supplied to inputs $x_1$ and $x_2$; with $f_c = 0$ the converse is the case. Unit AU, accordingly, always received the range bits of the code of larger absolute magnitude on its input $x_1$ and those of the code of smaller absolute magnitude on its input $x_2$. If the two codes happen to be of equal magnitude, the position of the multiplexers will be immaterial; in that case, as will be described hereinafter, the arithmetic unit AU does not intervene in this operating phase in which $c_6 = 0$.

Figure 6:
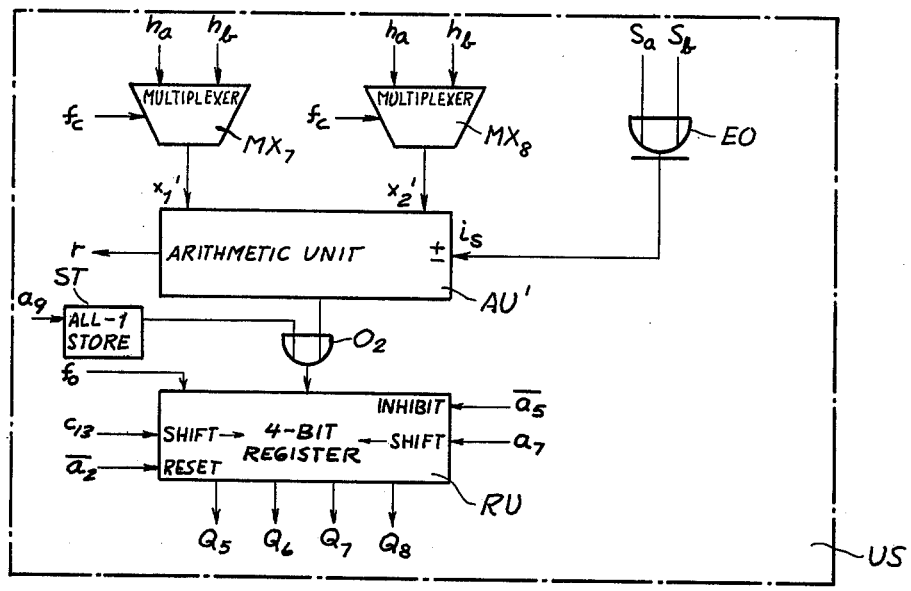

The values $\Delta t$ and $t^*$ issuing in different operating phases from unit AU are loaded, under the control of a signal $c_7$ from memory RP, into a reversible counter CS designed to be stepped backward by clock pulse $CK_4$ in the presence of signal $c_4$ applied to a countdown input thereof. Counter CS also has a "subtract 1" input, energizable by an output signal $a_8$ of a logic network LR of unit UO (FIG. 8), and an "add 1" input, energizable via an AND gate $N_6$ by a control signal $c_{13}$ from memory RP in the presence of a signal $i_s$ indicating identity of the polarity bits $s_a$, $s_b$ as determined by an Exclusive-OR gate EO in unit US (FIG. 6). Counter CS has three outputs delivering range bits $Q_2$, $Q_3$ and $Q_4$ to an eight-bit final register RC of output unit UU shown in FIG. 7. The three counter outputs are further connected to logic network RL and to three logic gates in parallel, namely a NOR gate $O_1$, an AND gate $N_8$ with two inverting inputs for bits $Q_2$ and $Q_3$, and an AND gate $N_9$ without inverting inputs. NOR gate $O_1$ generates a signal $$i_0 = \overline{Q_2} \cdot \overline{Q_3} \cdot \overline{Q_4} \tag{2}$$

whenever the count of component CS is 0. AND gate $N_8$ generates a signal $$i_1 = \overline{Q_2} \cdot \overline{Q_3} \cdot Q_4 \tag{3}$$

when the count has a value of 1. AND gate $N_9$ generates a signal $$i_7 = Q_2 \cdot Q_3 \cdot Q_4 \tag{4}$$

in the presence of a maximum count of numerical value 7.

Signals $K_1$ and $K_2$, designed to cause a downshift of the quantum bits $h_a$ and $h_b$ in registers $H_a$ and $H_b$ of FIG. 4, can be expressed by $$K_1 = c_4 \cdot (t_a < t_b) \cdot \overline{(t_a = 0)} \cdot (\Delta t = 1) \tag{5}$$

and $$K_2 = c_4 \cdot (t_a > t_b) \cdot \overline{(t_b = 0)} \cdot \overline{(\Delta t = 1)} \qquad (6)$$

clearing signals $K_1'$ and $K_2'$ can be written as $$k_1' = c_4 \cdot (t_b > t_a) \cdot (\Delta t > 4) \qquad (7)$$

and $$K_2' = c_4 \cdot (t_b < t_a) \cdot (\Delta t > 4) \qquad (8)$$

Equations (5) and (6) indicate that the register involved in the downshift is the one which carries the quantum bits of the smaller of the two codes A and B, i.e. register $H_a$ in the case of $t_a < t_b$ and $H_b$ in the case of $t_b < t_a$. These equations also show that no shift occurs, if the smaller code is of rank 0 and the difference $\Delta t$ between the two ranks is 1, i.e. if the larger code is of rank 1. Since the extent of the downshift is determined by the numerical differnce $\Delta t$, as will be more fully described hereinafter, a shift of the four quantum bits by more than three bit positions would completely empty the register stages assigned to these quantum bits. It is for this reason that clearing signals $K_1'$ and $K_2'$ will generated under the conditions indicated by equations (7) and (8), i.e. with the numerical difference $\Delta t$ exceeding the value 4.

Unit US, shown in FIG. 6, comprises two multiplexers $MX_7$ and $MX_8$ which are analogous to multiplexers $MX_5$ and $MX_6$ of unit UT and are also controlled by the switching signal $f_c$. These multiplexers receive the quantum bits $h_a$ and $h_b$ from registers $H_a$ and $H_b$ (FIG. 4) and deliver them in parallel to respective inputs $x_2'$ and $x_2'$ of an arithmetic unit AU'. Again, the bits of the larger code (as determined by signal $f_c$) are invariably applied to input $x_1'$ whereas those of the smaller code go to input $x_2'$. Unit AU' performs either an addition or a subtraction, depending on the presence or absence of the polarity-discriminating signal $i_s$ issuing from XOR gate EO. Gate EO has an output $i_s = 1$ only if bits $s_a$ and $s_b$ have different values, indicating opposite polarities of the voice samples represented by codes A and B. Bits $s_a$ and $s_b$ are available at the first stage outputs of registers $T_a$ and $T_b$ of preprocessor UP (FIG. 4). In the case of such diversity the quantum bits $h_a$ and $h_b$ must be summed differentially, rather than additively as when the two samples are of like polarity. Unit AU' works through an OR gate $O_2$ into a shift register RU with a storage capacity of four bits. Under certain conditions giving rise to a signal $\overline{a_9}$ in the output of logic network LR (FIG. 8), more fully described hereinafter, register RU can be loaded with an all-1 bit combination from a store ST via OR gate $O_2$. The bits stored in register RU can be shifted either to the left (up) or to the right (down) under the control of respective signals $a_7$ and $c_{13}$. An upshift can be inhibited by a signal $a_5$ and the entire register can be reset to zero by a clearing signal $a_2$. Signals $a_2$, $a_5$ and $a_7$ are generated by the logic network LR of FIG. 8 under conditions to be described. A carry signal $f_0$, originating at a read-only memory RZ of unit UO (FIG. 8), can be used to insert a bit into the first stage (at extreme left) of register RU vacated by a downshift. The register has four stage outputs carrying the quantun bits $Q_5$, $Q_6$, $Q_7$ and $Q_8$ of the composite code corresponding to the bits designated X, Y, Z and W of the above-identified CANDIANI patents.

Figure 7:
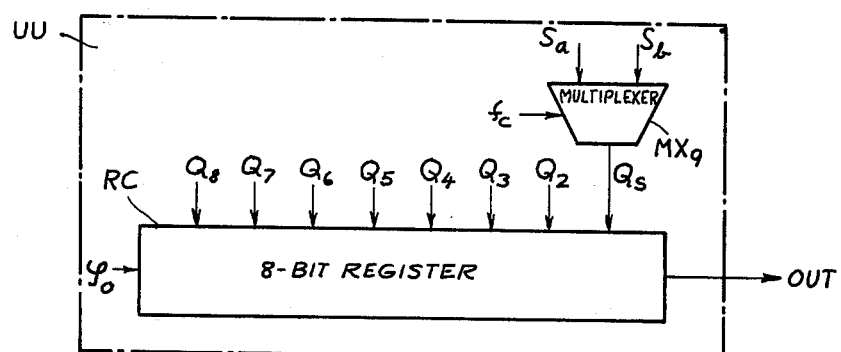

Register RC of output unit UU, illustrated in FIG. 7, has its last four stage inputs connected to the stage outputs of register RU to receive the bits $Q_5$-$Q_8$ therefrom, together with the bits $Q_2$-$Q_4$ from the counter CS of unit UT (FIG. 5). A multiplexer $MX_9$ controlled by a switching signal $f_c$ delivers either the polarity bit $s_a$ or the polarity bit $s_b$ to the first stage of register RC to form the corresponding bit $Q_s$ of the outgoing composite code, depending on whether code A or code B has the larger absolute value.

As shown in FIG. 8, the operational unit UO includes a logic section UL in addition to a program counter CP in memory RP. Logic section UL comprises the aforementioned network LR and memory RZ along with two multiplexers $MX_{10}$ and $MX_{11}$ feeding the bits $f_a$ and $f_b$ from the unshiftable sections of registers $H_a$ and $H_b$ to respective inputs of memory RZ under the control of switching signal $f_c$. Thus, the presence of a signal $a^*$ in the output of multiplexer $MX_{10}$ indicates that the larger of the two codes A and B has a rank greater than zero; similarly, the signal $b^*$ is present in the output of multiplexer $MX_{11}$ if the smaller code is also at least of rank 1. Signal $a^*$, whose absence represents the condition $t_a = t_b = 0$, is also fed to the logic network LR along with timing signals $c_4$ and $c_8$-$c_{11}$ from memory RP, output signals $i_0$, $i_1$ and $i_7$ of counter CS (FIG. 5), signal $\Delta t$ from arithmetic unit AU and signals $t$, $h$, from comparators $ID_3$, $ID_4$ of FIG. 4. Network LR generates the various command signals $a_1$-$a_9$ partly referred to above. Program counter CP has an operating cycle of 16 phases representing as many cycles of the basic clock signal $CK_4$. In phase $\phi_0$ its program is arrested and the contents of register RC (FIG. 7) are read out. The program is started by the pulse SP (see FIG. 3) and can be foreshortened by the de-energization of a reset input normally receiving voltage from an AND gate $N_7$ with inputs receiving signals $a_2$, $\overline{c_{10}}$ and $a_4$. A "hold" input arrests the program in the absence of a signal $a_3$. Two other inputs, normally receiving signals $a_1$ and $a_6$, cause a jump of the program to phase $\phi_{11}$ or $\phi_{15}$ upon the disappearance of these signals in phases $\phi_9$ and $\phi_{11}$, respectively.

Figure 9:
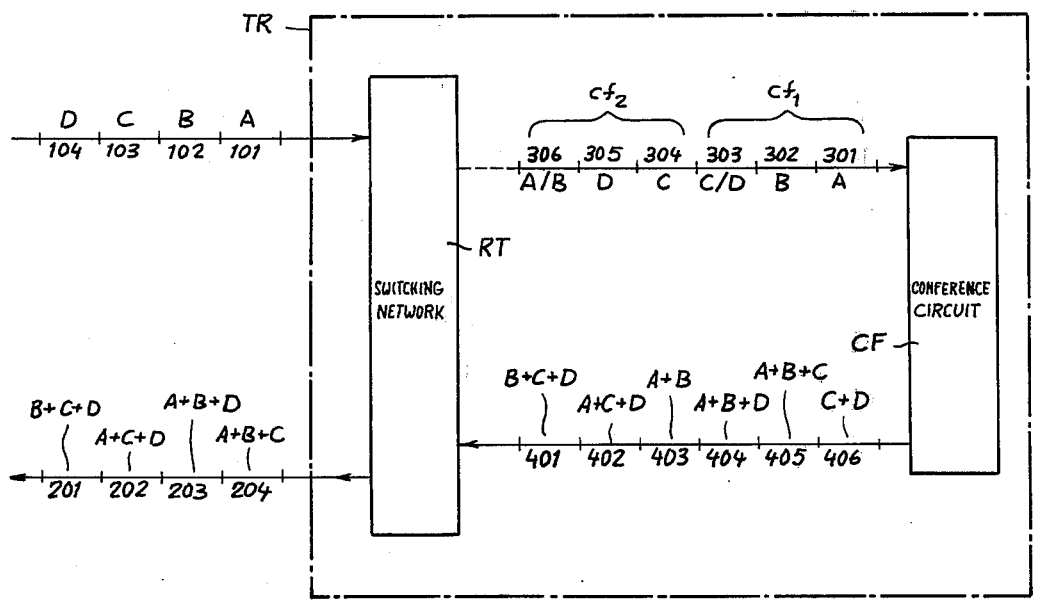
FIG. 9 is a diagram of a transit exchange similar to that shown in FIG. 1 but designed for conference calls among four subscribers.

The sequence in which the output signals $c_1$-$c_{13}$ are generated by memory RP, in the various phases of program counter CP, has been indicated in the flow chart of FIG. 9.

In the first four phases, $\phi_1$-$\phi_4$, signal $c_1$ is present and causes the loading of registers $T_a$ and $T_b$ with polarity bits $s_a$ and $s_b$ and range bits $t_a$, $t_b$, respectively. In the next four phases $\phi_5$-$\phi_8$, signals $c_2$ and $c_3$ enter the quantum bits $h_a$ and $h_b$ in the registers $H_a$, $H_b$. In phase $\phi_9$ the multiplexers $MX_3$ and $MX_4$ are switched by the disappearance of signal $c_2$; with signal $c_5$ generated and with registers $H_a$ and $H_b$ still enabled by signal $c_3$, these multiplexers write the bits $f_a$ and $f_b$ in the first stages of these registers, displacing the quantum signals already there by one bit position. Signal $c_9$ is also generated at this point.

With the appearance of signal $c_9$, logic LR explores the possibility that the two codes to be combined are of equal rank. If this happens to be the case, the command $\overline{a_1}$ is generated according to the formula $$\overline{a_1} = c_9 \cdot (t_a = t_b) \qquad (9)$$

Figure 10:
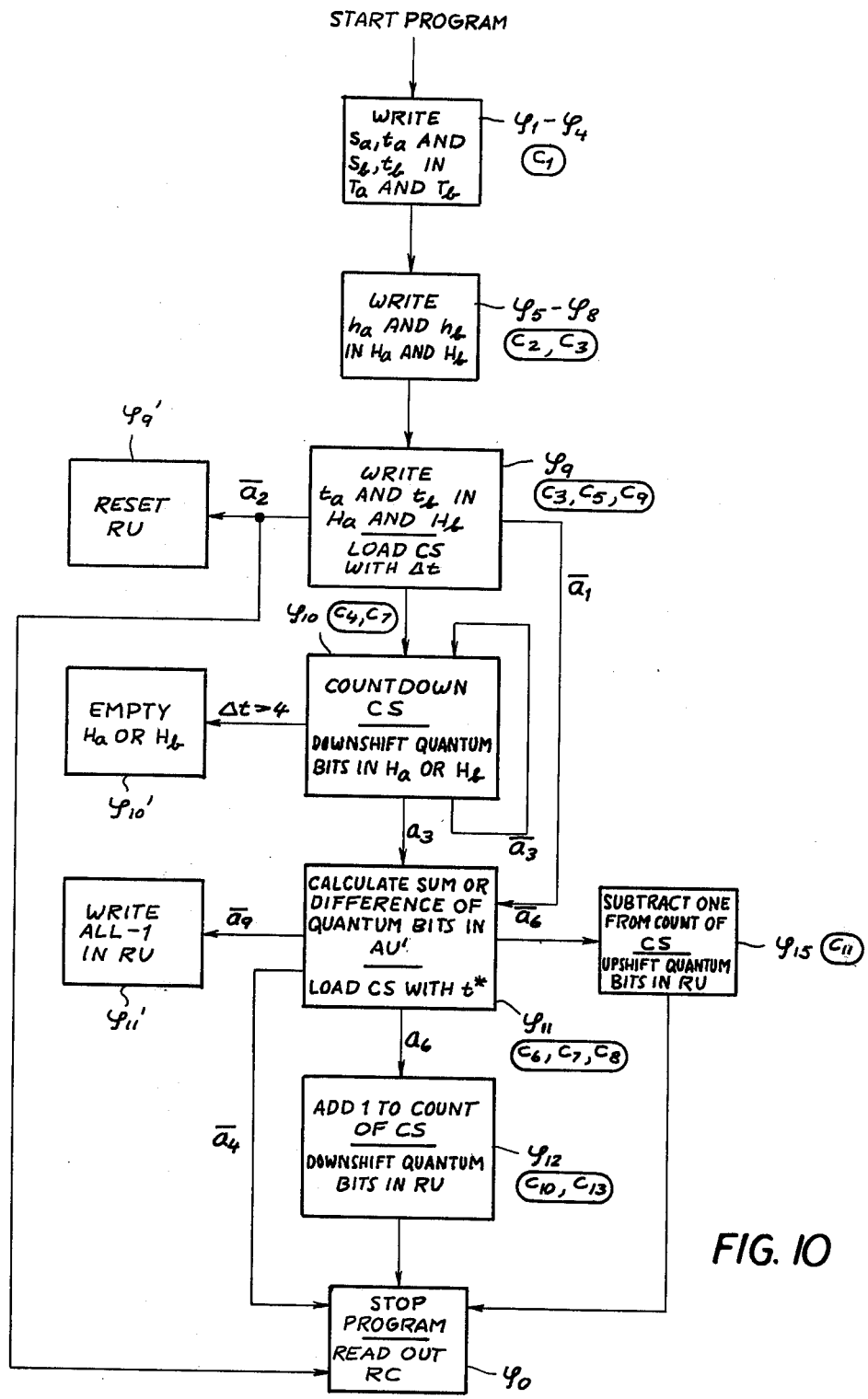
FIG. 10 is a flow chart relating to the operation of a program counter included in the operating unit of FIG. 8.

Signal $\overline{a_1}$ causes a jump to state $\phi_{11}$ unless overridden by a signal $\overline{a_2}$ according to the formula $$\overline{a_2} = c_9 \cdot (t_a = t_b) \cdot (h_a = h_b) \cdot i_s \qquad (10)$$

indicating that the two samples are of the same amplitude but opposite sign. The occurrence of signal $\overline{a_2}$ resets the program counter CP to its state $\phi_0$ whereby register RC of input unit UU (FIG. 7) is unloaded with an all-0 code since the same signal $\overline{a_2}$ resets the register RU of FIG. 6 (state $\phi_9'$ in FIG. 10) and since the counter CS is empty at this instant as will presently become apparent.

If $t_a \neq t_b$, signal $c_7$ generated in phase $\phi_{10}$ causes the unit CS to be loaded with the difference $\Delta t$ computed in the interim by the arithmetic unit AU. If $\Delta t > 4$, clearing signal $K_1'$ or $K_2'$ is generated according to equation (7) or (8) to empty the register $H_a$ or $H_b$ of quantum bits as already described (state $\phi_{10}'$).

If the value of $\Delta t$ is $> 1$ but does not exceed 4, signal $a_3$ disappears according to the formula $$\overline{a_3} = \overline{i_1} \cdot (\Delta t < 4) \cdot c_4 \tag{11}$$

under the control of signal $c_4$ generated in this phase. Program counter CP is thus put on "hold" for as many clock cycles as is necessary to reduce the count of component CS to 1. At the same time the quantum bits in register $H_a$ or $H_b$ (whichever happens to carry part of the larger code) are downshifted by as many positions by signal $K_1$ or $K_2$ until the program is restarted by the appearance of signal $a_3$ with $i_1 = 1$. At this instant the logic network RL receives from counter CS an output signal equivalent to $\Delta t = 1$ so that signal $K_1$ or $K_2$ terminates if the smaller code happens to be of rank 0, i.e. if $t_b = 0$ or $t_a = 0$ as the case may be. In that instance the downshifting of register $H_a$ or $H_b$ stops but the counter CS takes one further step to 0. If, however, the smaller code has a rank higher than 0, the downshift goes on until the disappearance of signal $c_4$ which may occur in the 11th, 12th, 13th or 14th phase according to the number of clock signals required to step down the counter CS. The program counter CP then reaches the state $\phi_{11}$ which therefore does not necessarily coincide with the 11th phase.

In state $\phi_{11}$ the signals $c_6$ and $c_8$ come into existence while signal $c_7$ recurs. Signal $c_6$ blocks the input $x_2$ of arithmetic unit AU so that only the range bits of the larger codes are received by unit AU at its input $x_1$ and are passed through to encounter CS. The following alternatives will now have to be considered:

Polarity-discriminating signal $i_s$ may be either 0 or 1. In the first instance, the addition of the quantum bits present on inputs $x_1'$, and $x_2'$ of arithmetic unit AU' (FIG. 6) may or may not give rise to a positive carry. In the second instance, since the numerical value of the quantum bits of the larger code may be less than that of the quantum bit of the smaller code, the subtraction performed in the unit AU' may result in a negative carry. The occurrence of either type of carry is marked by an output signal $r$ of unit AU' delivered together with signal $i_s$ to memory RZ of operating unit UO. The carry signal $f_0$ is given by:

$$f_0 = \overline{i_s} \cdot r \cdot (a^* + i \cdot b^*) + i_s \cdot \overline{r} \tag{12}$$

Thus, in the case of an adding operation ($i_s = 0$) the presence of a signal $r$ will produce the signal $f_0$ only if at least one of the two codes has a rank higher than 1. In the case of subtraction, signal $f_0$ will be generated as long as signal $r$ is absent.

With the occurrence of signal $c_8$ in state $\phi_{11}$ the signal $a_4$ will disappear if no carry is present and if at least one of the codes has the rank 0, according to the formula:

$$\overline{a_4} = c_8 \cdot (\overline{i_s} \cdot \overline{r} \cdot \overline{b^*} + i_s \cdot f_0 + i_s \cdot \overline{a^*} + \overline{i_s} \cdot r \cdot i_7 + \overline{i_s} \cdot i_7 \cdot b^*) \tag{13}$$

This immediately resets the program counter PC and fills the register RC with the bits held in counter CS and register RU.

If, in the additive case, a carry is present and/or the smaller code is of a rank greater than 0, signal $\overline{a_9}$ comes into being according to the formula $$\overline{a_9} = \overline{i_s} \cdot i_7 \cdot (r + b^*) \tag{14}$$

This loads the register RU with a bit combination 1 - 1 - 1 - 1 so that an all-1 code is delivered to register RC.

If the aforedescribed conditions are not met, program counter CP continues to its next state $\phi_{12}$ in which signals $c_{10}$ and $c_{13}$ are generated. Signal $c_{13}$ now increases the count of component CS by 1 and simultaneously downshifts the contents of register RU by one bit position unless such shift is inhibited by a signal $a_5$ according to the formula :

$$a_5 = i_0 \cdot c_{10} \tag{15}$$

indicating that the larger code is of rank 0. Signal $c_{10}$ then steps the counter CP to its initial state $\phi_0$ while a bit corresponding to signal $f_0$ is introduced into the stage of register RU vacated by the 1-position downshift caused by signal $c_{13}$.

If the two voice samples are of opposite polarities, signal $a_6$ disappears in state $\phi_{11}$ according to the formula:

$$\overline{a_6} = i_s \cdot c_8 \tag{16}$$

and causes a jump to state $\phi_{15}$ with generation of signal $c_{11}$, producing in turn the signal $a_8$ given by $$a_8 = i_s \cdot c_{11} \tag{17}$$

Signal $a_8$ diminishes the count of component CS by 1 and is accompanied by a 1-position upshift of the contents of register RU by 1-bit position under the control of signal $a_7$ as long as counter CS has an output other than $i_7$, according to the formula:

$$a_7 = i_1 \cdot c_{11} \tag{18}$$

From state $\phi_{15}$ the program counter reaches a final state $\phi_0$ to stop the program.

Since equation (13) includes the terms of equation (14), a resetting of the program counter occurs also under the conditions in which an all-1 code is entered in register RC. Counter CS is cleared during each such resetting.

EXAMPLES

| Code | | | | | | Numerical Value |
|---|---|---|---|---|---|---|
| I | 000 | - | 1100 | $\Delta t$ | = 0 | 12 |
| +II | 000 | - | 1000 | $r$ | = 1 | 8 |
| I+II | 001 | - | 0100 | $f_0$ | = 0 | 20 |
| I | 001 | - | 1100 | $\Delta t$ | = 1 | 28 |
| +II | 000 | - | 1000 | $r$ | = 1 | 8 |
| | | | 0100 | $f_0$ | = 0 | |
| DOWNSHIFT | | | 0010 | | | |
| I+II | 010 | - | 0010 | | | 36 |
| I | 010 | - | 1000 | $\Delta t$ | = 2 | 48 |
| +II | 000 | - | 0100 | $r$ | = 0 | 4 |
| | | | 0100 | $f_0$ | = 0 | |

EXAMPLES-continued

| Code | | | | | | Numerical Value |
|---|---|---|---|---|---|---|
| DOWNSHIFT | | | 0010 | | | |
| I+II | 010 | - | 1010 | | | 52 |
| I | 010 | - | 1110 | $\Delta t$ | = 0 | 60 |
| +II | 101 | - | 1100 | r | = 1 | 56 |
| | | | 1010 | $f_0$ | = 1 | |
| DOWNSHIFT | | | 0101 | | | |
| I+II | 011 | - | 1101 | | | 116 |
| I | 010 | - | 0001 | $\Delta t$ | = 2 | 34 |
| −II | 000 | - | 0100 | r | = 1 | −4 |
| DOWNSHIFT | | | 0010 | $f_0$ | = 0 | |
| | | | 1111 | | | |
| UPSHIFT | | | 1110 | | | |
| I −II | 001 | - | 1110 | | | 30 |

In FIG. 9 we have shown a modification of exchange TR to handle a conference call among four subscribers sending out voice codes A, B, C and D in respective time slots 101–104 and receiving compound codes B+C+D, A+C+D, A+B+D and A+B+C in respective time slots 201–204. Within exchange TR the codes are transmitted from network RT to conference unit CF in six time slots 301–306 and, after compounding, returned to the network in six time slots 401–406. The codes A and B alternate in time slot 306 even as codes C and D alternate in time slot 303. Thus, these codes may be considered as grouped in two conference combinations $cf_1$ and $cf_2$. The compound codes A+B and C+D, occurring in time slots 403 and 406, are not utilized by the switching network RT.

We claim:

1. A method of linearly superposing significant portions of logarithmically coded coincident voice samples in a conference call, each voice-sample code consisting of a polarity bit, a plurality of higher-order range bits and a plurality of lower-order quantum bits, the numerical weights of said quantum bits depending on the rank of the code as determined by said range bits, comprising the steps of:
   a. separately storing a higher-ranking code and a lower-ranking code derived from a pair of coincident voice samples to be arithmetically combined;
   b. downshifting the quantum bits of the lower-ranking code to less significant bit positions in which they would have their original numerical weights if prefaced by the range bits of the higher-ranking code;
   c. comparing the polarity bits of the two codes stored in step (a); and
   d. subjecting the quantum bits of the higher-ranking code and the downshifted quantum bits of the lower-ranking code to an algebraic summing operation with a sign depending on the relative values of the corresponding polarity bits as determined by step (c).

2. A method as defined in claim 1 wherein the numerical weights of the quantum bits in codes of rank 0 and rank 1 are the same, the quantum bits of the lower-ranking code being downshifted in step (b) by a number of bit positions equal to the difference in rank upon said lower-ranking code being above rank 0 and by a number of bit positions equal to said difference minus one upon said lower-ranking code being of rank 0.

3. A method as defined in claim 2 wherein an additive summing operation in step (d), in the presence of identical polarity bits, is followed by the steps of (e) incrementing by one the numerical value of the combination of range bits of the higher ranking code, (f) downshifting by one bit position the bits constituting the sum of the additively summed quantum bits including any carry resulting from the addition, and (g) juxtaposing the incremented range bits from step (e) with all but the lowest of the downshifted bits from step (f) to form a composite code.

4. A method as defined in claim 2 wherein a subtractive summing operation in step (d), in the presence of different polarity bits, is followed by the steps of (e) determining whether the subtraction of the quantum bits of the lower-ranking code from those of the higher-ranking code produces a negative carry, (f) decrementing the numerical value of the combination of range bits of the higher-ranking code by one in the presence of a negative carry while upshifting by one bit position the quantum bits constituting the difference of the subtractively summed quantum bits unless the higher-ranking code is of rank 1, and (g) juxtaposing the range bits of the higher-ranking code with the differentially obtained quantum bits, as modified in accordance with step (f) but without the highest upshifted quantum bit in the presence of a negative carry, to form a composite code.

5. A system for linearly superposing significant portions of logarithmically coded voice samples in a conference call, each voice-sample code consisting of a polarity bit, a plurality of higher-order range bits and a plurality of lower-order quantum bits, the numerical weights of said quantum bits depending on the rank of the code as determined by said range bits, comprising:
   code-receiving means including two storage circuits each including first register means for storing polarity and range bits and second register means for storing quantum bits of respective codes to be arithmetically combined;
   first arithmetic means connected to said first register means for determining the difference in ranks between said respective codes;
   linearization means connected to said second register means and controlled by said first arithmetic means for downshifting the quantum bits of the lower-ranking code to less significant bit positions in which they would have their original numerical weights if prefaced by the range bits of the higher-ranking code;
   second arithmetic means connected to said second register means and controlled by the contents of said first register means for subjecting the quantum bits of the higher-ranking code and the downshifted quantum bits of the lower-ranking code to an algebraic summing operation with a sign depending on the relative values of the corresponding polarity bits; and
   evaluation means connected to said first and second arithmetic means for deriving a composite code from the range bits of the higher-ranking code and the quantum bits resulting from said algebraic summing operation.

6. A system as defined in claim 5 wherein said evaluation means comprises a shift register with $n$ stages connected to be loaded with resultant bits by said second arithmetic means, $n$ being the number of quantum bits in each code, and logic circuitry connected to said second arithmetic means to said storage circuits for shifting the bits in said stages in a sense depending upon the magnitudes of said range bits and the presence of a carry due to said algebraic summing operation.

7. A system as defined in claim 6 wherein said evaluation means further comprises a reversible counter connected to said first arithmetic means for receiving therefrom the range bits of the higher-ranking code, said counter being provided with $m$ outputs where $m$ is the number of range bits in each code, and a final register connected to said $m$ outputs and said $n$ stages, said logic circuitry being connected to said counter for modifying the contents thereof in a sense opposite the sense of shifting of the bits in said stages.

8. A system as defined in claim 7 wherein said shift register is provided with an input connected to said logic circuitry for introducing a positive carry into a stage vacated by a downshifting of said resulting bits.

9. A system as defined in claim 7 wherein said evaluation means further includes memory means controlled by a program counter and switchover means under the control of said memory means for actuating said first arithmetic means to load said counter in a first operating phase with the numerical difference between the combinations of range bits of said respective codes and in a second operating phase with the numerical value of the combination of range bits of the higher-ranking code only, said linearization means being controlled by said first arithmetic means through said counter in said first operating phase.

10. A system as defined in claim 9 wherein said logic circuitry further includes comparison means connected to said first register means for determining the relative magnitudes of the polarity and range bits of said respective codes, said program control being responsive to siad comparison means for skipping said first operating phase upon equality of the range bits of said respective codes.

11. A system as defined in claim 10 wherein said logic circuitry further includes other comparison means connected to said second register means for determining the relative magnitudes of the quantum bits of said respective codes, said shift register being provided with a resetting connection controlled by both said comparison means for delivering an all-zero bit combination to said final register upon equality of the range and quantum bits and diversity of the polarity bits of said respective codes.

12. A system as defined in claim 10 wherein said logic circuitry further includes loading means controlled by said comparison means and effective in said second operating phase to enter an all-one bit combination in said shift register for delivery to said final register, upon equality of said polarity bits, in response to a maximum numerical value of the combination of range bits of the higher-ranking code and in the presence of certain numerical values of the lower-ranking code.

* * * * *